(12) United States Patent
Lin et al.

(10) Patent No.: US 8,770,856 B2
(45) Date of Patent: *Jul. 8, 2014

(54) SHUTTER MEMBER FOR OPTICAL FIBER ADAPTER AND OPTICAL FIBER ADAPTER WITH THE SAME

(75) Inventors: I En Lin, Taipei (TW); Tomoyuki Mamiya, Marlborough, MA (US)

(73) Assignees: Protai Photonic Co., Ltd., New Taipei (TW); Senko Advanced Components, Inc., Marlborough, MA (US)

( * ) Notice: Subject to any disclaimer, the term of this patent is extended or adjusted under 35 U.S.C. 154(b) by 129 days.

This patent is subject to a terminal disclaimer.

(21) Appl. No.: 13/420,704

(22) Filed: Mar. 15, 2012

(65) Prior Publication Data
US 2013/0071067 A1 Mar. 21, 2013

(30) Foreign Application Priority Data
Sep. 21, 2011 (CN) .......................... 2011 1 0281078

(51) Int. Cl.
*G02B 6/00* (2006.01)
*G02B 6/36* (2006.01)
*G02B 6/38* (2006.01)

(52) U.S. Cl.
USPC ................................ 385/53; 385/75; 385/134

(58) Field of Classification Search
USPC ..................... 385/52–57, 88–92, 147, 75, 134
See application file for complete search history.

(56) References Cited

U.S. PATENT DOCUMENTS

| 6,461,054 | B1 * | 10/2002 | Iwase ............................... 385/73 |
| 8,491,198 | B2 * | 7/2013 | Lin ................................. 385/75 |
| 8,628,254 | B2 * | 1/2014 | Lin et al. .......................... 385/70 |
| 2012/0321266 | A1 * | 12/2012 | Lin et al. ........................ 385/134 |
| 2013/0064517 | A1 * | 3/2013 | Lin et al. ........................ 385/134 |
| 2013/0071068 | A1 * | 3/2013 | Lin ................................. 385/75 |

* cited by examiner

*Primary Examiner* — Akm Enayet Ullah
(74) *Attorney, Agent, or Firm* — Lowe Hauptman & Ham, LLP

(57) ABSTRACT

An optical fiber adapter according to the present disclosure includes a main body and an elastic shutter member. The main body has an accommodation room defined by a first wall, a second wall, a third wall and a fourth wall, wherein the first wall faces the third wall and connects with the second and fourth walls. An indentation is formed outside the accommodation room and on the third wall. The shutter member includes a fixing portion positioned within the accommodation room and on the third wall, a shutter plate, a connecting portion connecting the fixing portion with the shutter plate, and a hooking portion extending from the connecting portion to hook on to the indentation on the third wall. The shutter plate extends from the connecting portion and into the accommodation room.

9 Claims, 9 Drawing Sheets

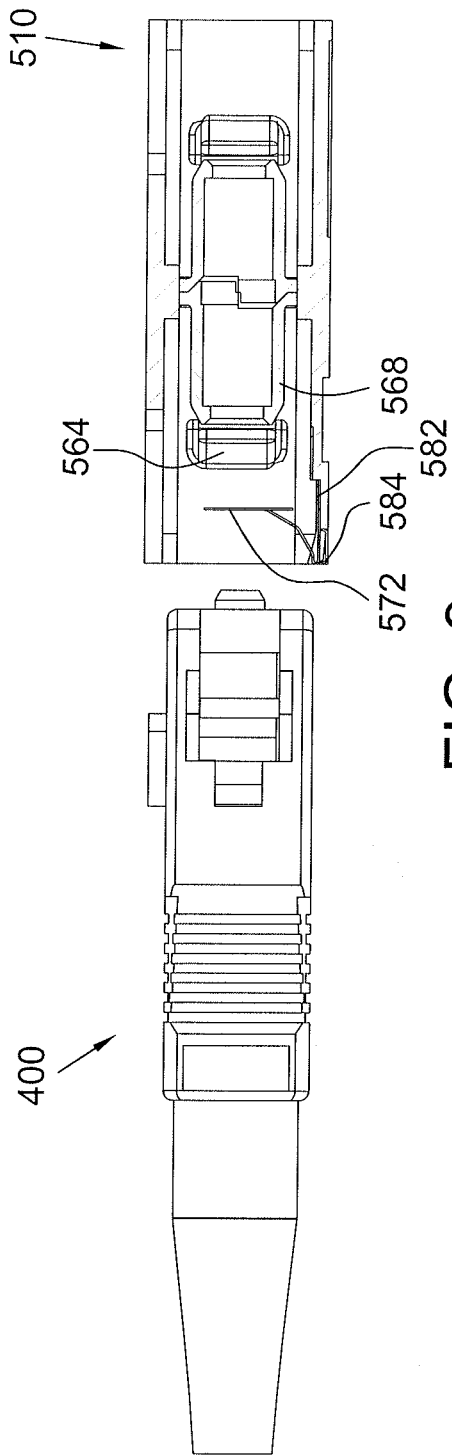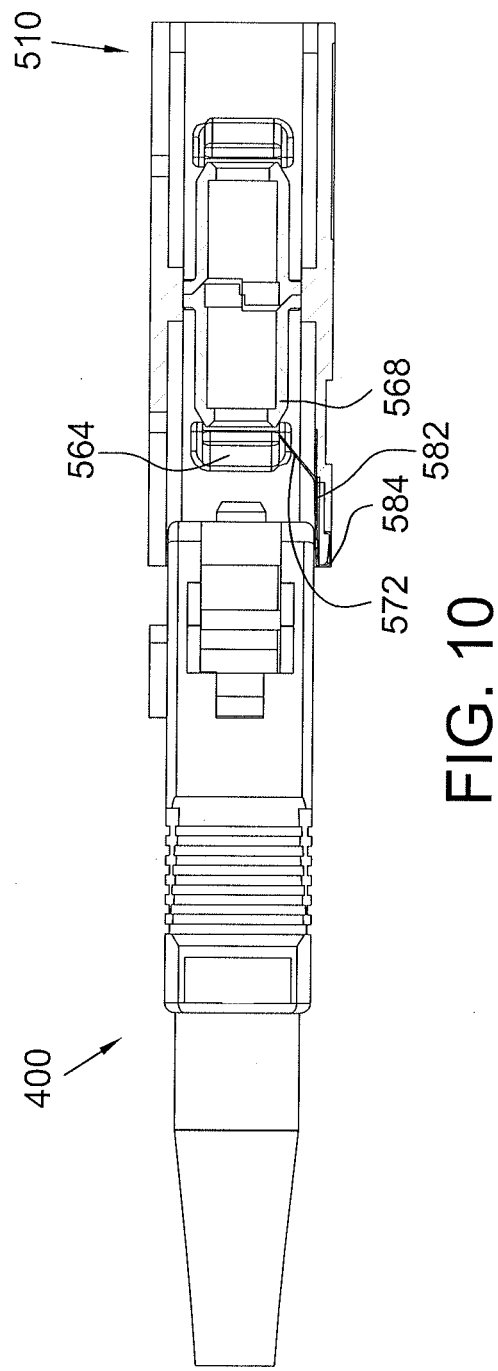

SHUTTER MEMBER FOR OPTICAL FIBER ADAPTER AND OPTICAL FIBER ADAPTER WITH THE SAME

CROSS REFERENCE TO RELATED APPLICATION

This application claims the priority benefit of China Patent Application Serial Number 201110281078.1 filed Sep. 21, 2011, the full disclosure of which is incorporated herein by reference.

BACKGROUND OF THE INVENTION

1. Field of the Invention

The present invention relates to an optical fiber adapter, and more particularly, to an optical fiber adapter with a shutter member.

2. Description of the Related Art

Recently, the optical fiber has been widely used as signal transmission media because of its high bandwidth and low loss nature. In order to transmit over a longer distance without the need of repeaters, it is common to use a high power diode laser to launch a laser beam into the optical fiber. However, the high power laser beam used to carry information is usually invisible. In other words, the human eyes will be unable to sense the high power laser beam if it leaves from the open end of a fiber cable. Thus, it is required to obstruct the high power laser beam to avoid hurting the eyes when the laser beam leaves from an optical fiber.

Referring to FIG. 1, a conventional fiber adapter 100 includes a housing 110 having a plurality of side walls 160. The side walls 160 define a receiving recess 120. One of the side walls 160 is provided with a slot 130 for mating with the key 192 of the connector 190 when the connector 190 is inserted into the receiving recess 120. In addition, the outer surfaces of two opposite side walls 160 are provided with recesses 140 that a clip (not shown in the figure) can be disposed thereon to facilitate the adapter 100 to be mounted on a panel.

In general, the adapter 100 further has another set of side walls 160 that defines another receiving recess 120. The two receiving recesses 120 are opposite and can respectively receive a connector 190. Of course, the two receiving recesses 120 of the adapter 100 can be designed to mate with two different types of connectors. The fiber connector 190 is always attached to one end of a fiber cable 194 and a light beam can propagate down the fiber cable 194 and emit from the ferrule 196 of the connector 190. Likewise, a light beam can be coupled into the fiber cable 194 from the end face of the ferrule 196.

When the adapter 100 is used to couple two connectors 190 together, the two connectors 190 are respectively inserted into the receiving recesses 120. The ferrules 196 of the connectors 190 thus slide into a hollow sleeve (not shown in the figure) and are brought into axial alignment and contact with each other. A light beam will be able to propagate from the fiber cable 194 of a connector 190 through the interface between the two ferrules 196 and then reach the fiber cable 194 of the other connector 190, and vice versa.

When one connector 190 is disconnected from the adapter 100, the light beam originally propagating from the connector 190 still kept in the adapter 100 to the presently disconnected connector 190 will now leave the ferrule 196 and emit from the receiving recess 120. If the emitted light beam is high power and not obstructed, a lasting exposure to such light beam is harmful to people, particularly to the eyes. Thus, to avoid exposing to the high-power light beam, it is common to use a cap 180 to block up the unused receiving recess 120. This can obstruct the light beam and also prevent the receiving recess 120 from dust. If a connector 190 would like to be mated with the adapter 100, the cap 180 is required to be removed. However, the cap 180 is apt to get lost and it is still possible to expose the eyes to the light beam during mating.

Referring to FIG. 2, a conventional fiber adapter 200 is generally the same as the adapter 100 but further includes a cover 250 pivotally connected to the housing 110. The cover 250 covers the receiving recess 120 in its closed position. A spring 260 can force the cover 250 to be pivoted to its closed position when the receiving recess 120 is not mated with a connector 190. Thus, the cover 250 is capable of obstructing the light beam emitted from the receiving recess 120 in its closed position. If a user would like to mate a connector 190 with the adapter 200, he is first required to lift the cover 250 from its closed position and then to insert the connector 190 into the receiving recess 120. Upon pulling out the connector 190, the cover 250 is pivoted to cover the receiving recess 120 through the spring 260. As a result, the user has no chance to expose to the high-power light beam. However, the construction of the adapter 200 is much more complex than that of the adapter 100.

Referring to FIG. 3, a conventional protection cap 300 for the fiber adapter 100 includes a hollow housing 310 with two opposing openings and a cover 350 pivotally connected to the housing 310. The cover 350 is pivoted to cover one of the two openings through a spring 360. The protection cap 300 can be put on the adapter 100 and cover the outer surfaces of the side walls 160 and the receiving recess 120 of the adapter 100. When a user would like to mate a connector 190 with the adapter 200, he is required to lift the cover 350 from its closed position and then to insert the connector 190 into the receiving recess 120. Likewise, upon pulling out the connector 190, the cover 350 is pivoted to cover the receiving recess 120 by the spring 360. As a result, the user has no chance to expose to the high-power light beam emitted from the receiving recess 120. However, the structure of the protection cap 300 is somewhat complex and therefore it is not inexpensive. The introduction of the protection cap 300 to obstruct the light beam will cost much.

Accordingly, there exists a need to provide a solution to solve the aforesaid problems.

SUMMARY OF THE INVENTION

The present disclosure provides a shutter member for an optical fiber adapter that may obstruct the light beams emitted from the accommodation room thereby preventing the eyes from exposure to the light beams.

In one embodiment, the shutter member of the present disclosure includes a fixing portion; a shutter plate; a connecting portion connecting the fixing portion with the shutter plate; and a hooking portion having a first vertical portion, a horizontal portion and a second vertical portion. The first vertical portion extends from the connection portion, the horizontal portion extends from the first vertical portion, and the second vertical portion extends from the horizontal portion.

The present disclosure further provides an optical fiber adapter, which includes a main body and an elastic shutter member. The main body has an accommodation room defined by a first wall, a second wall, a third wall and a fourth wall, wherein the first wall faces the third wall and connects with the second and fourth walls. An indentation is formed outside the accommodation room and on the third wall. The shutter member includes a fixing portion positioned within the accommodation room and on the third wall, a shutter plate, a connecting portion connecting the fixing portion with the shutter plate, and a hooking portion extending from the connecting portion to hook on to the indentation on the third wall. The shutter plate extends from the connecting portion and into the accommodation room.

According to the present disclosure, wherein the horizontal portion of the shutter member is positioned outside the accommodation room and on the third wall, and the second vertical portion of the shutter member extends into the indentation on the third wall.

According to the present disclosure, wherein the horizontal portion of the hooking portion is positioned in a recess on the third wall.

According to the present disclosure, wherein two protrusions are formed on the third wall of the main body. Each of the protrusions includes a vertical portion extending from the third wall and a horizontal portion extending from the vertical portion, wherein a gap is formed between the horizontal portion and the third wall. The fixing portion of the shutter member has two opposing sides and each of the two opposing sides is positioned between the third wall and the horizontal portion of one of the protrusions.

According to the present disclosure, wherein the shutter member is made of metal.

According to the present disclosure, wherein the optical fiber adapter is an SC type optical fiber adapter.

According to the present disclosure, wherein the indentation extends through the third wall into the accommodation room.

The foregoing, as well as additional objects, features and advantages of the disclosure will be more readily apparent from the following detailed description, which proceeds with reference to the accompanying drawings.

BRIEF DESCRIPTION OF THE DRAWINGS

FIGS. 9 and 10 illustrate how to mate an optical fiber connector with the optical fiber adapter of the present disclosure.

DETAILED DESCRIPTION OF THE PREFERRED EMBODIMENT

Figure 1:
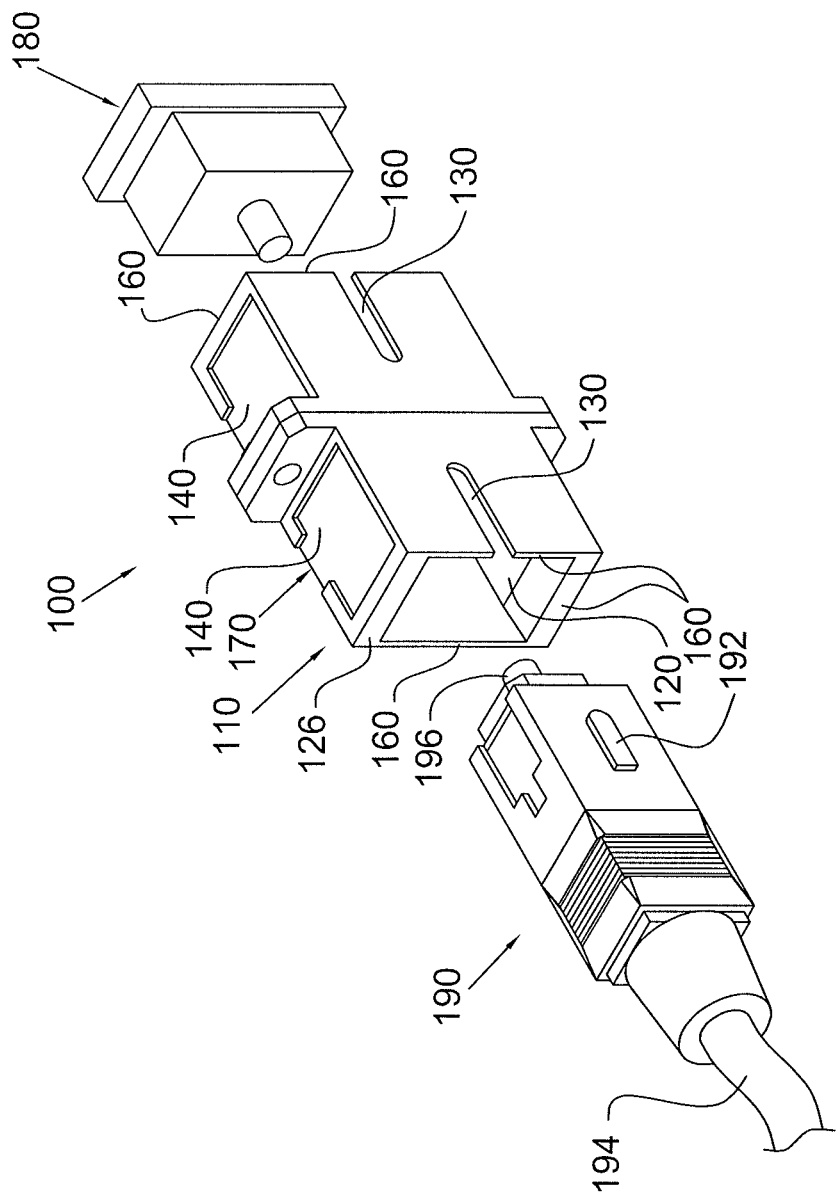
FIG. 1 is an elevated perspective view illustrating a conventional optical fiber adapter and a conventional optical fiber connector.
Figure 2:
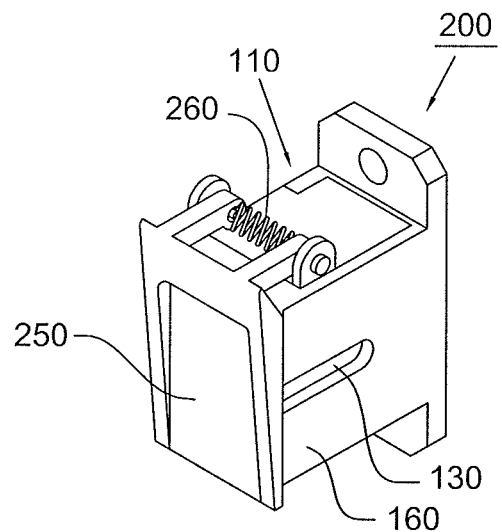
FIG. 2 is an elevated perspective view of a conventional optical fiber adapter with a cover for obstructing the light beams emitted from the receiving recess.
Figure 3:
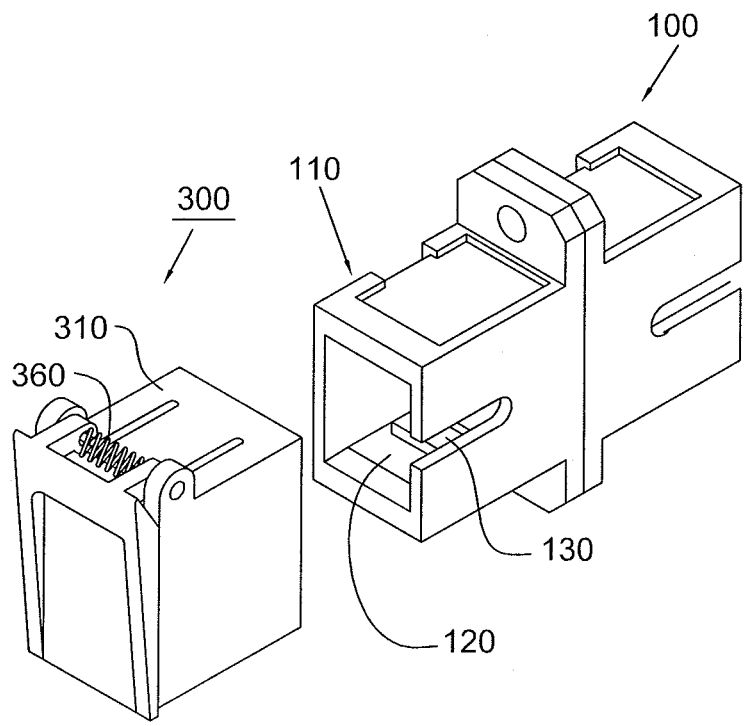
FIG. 3 is an elevated perspective view of a conventional protection cap for an optical fiber adapter.
Figure 4:
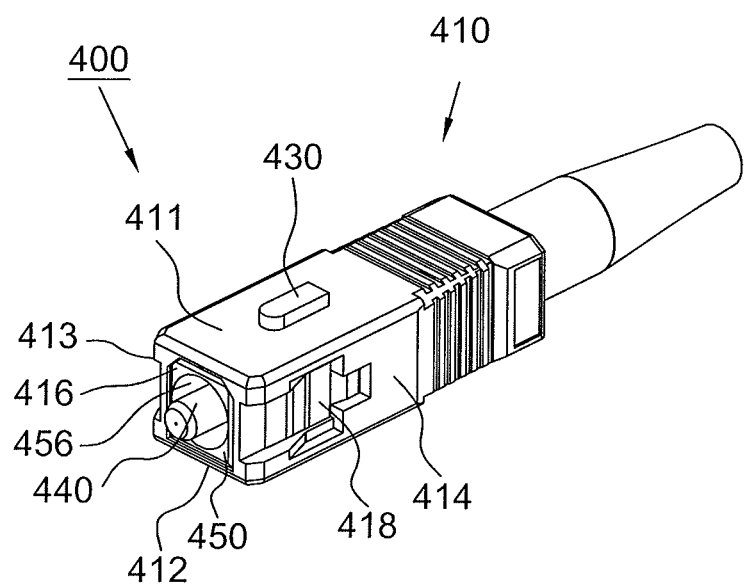
FIG. 4 is an elevated perspective view illustrating a conventional SC type optical fiber connector.
Figure 5A:
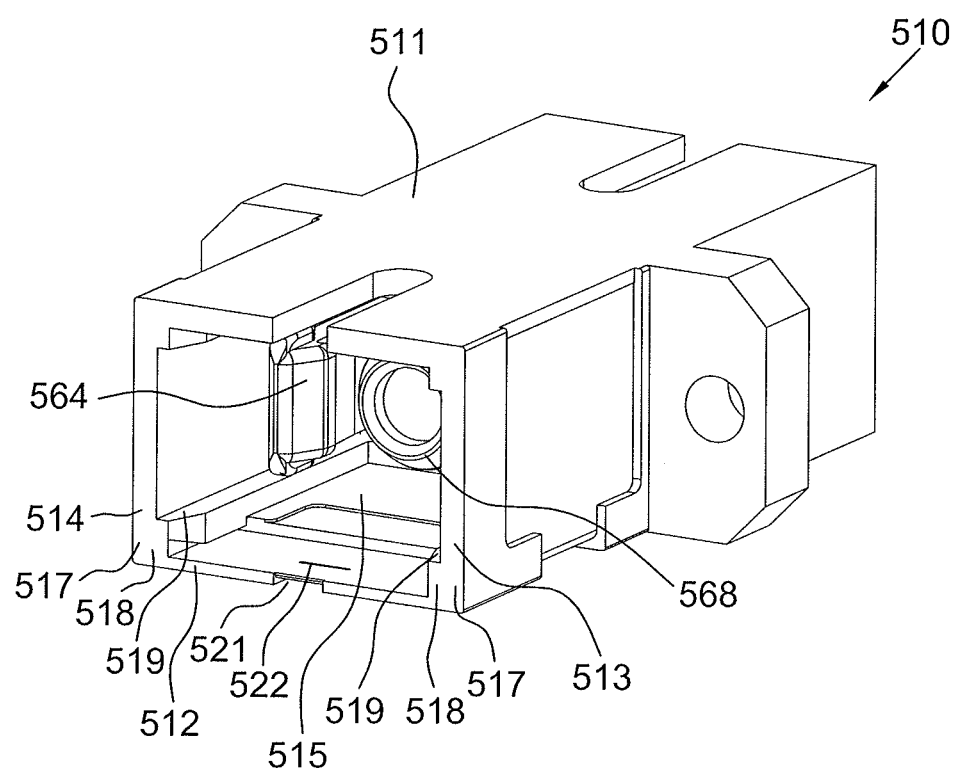
FIG. 5a is an elevated perspective view of the main body of the optical fiber adapter of the present disclosure.
Figure 5B:
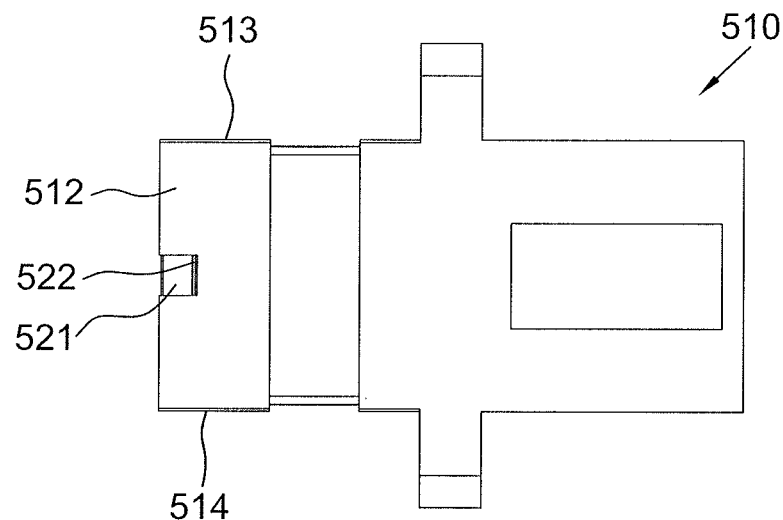
FIG. 5b is a bottom view of the main body of the optical fiber adapter of the present disclosure.
Figure 5C:
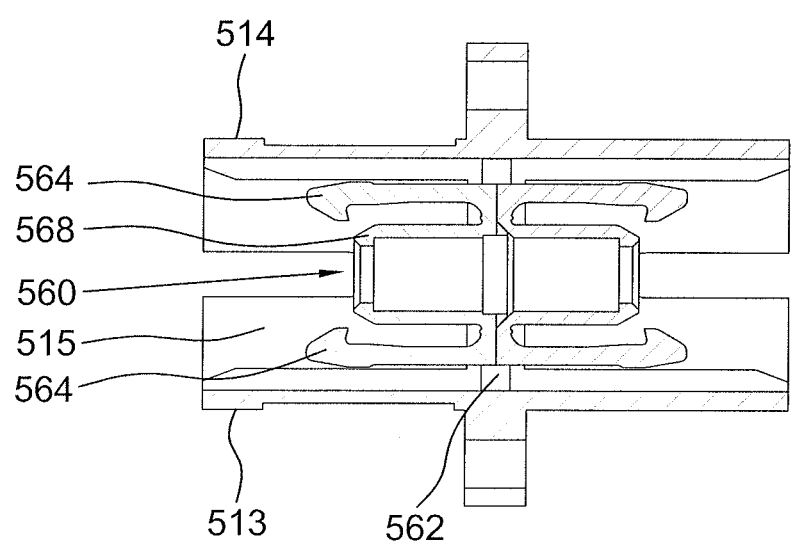
FIG. 5c is a cross-sectional view of the main body of the optical fiber adapter of the present disclosure.

Referring to FIG. 4, a conventional SC type optical fiber connector 400 has a generally rectangular shape with a square cross section. The connector 400 includes a rectangular hollow outer housing 410 comprised of a top side-wall 411, a bottom side-wall 412, a right side-wall 413 and a left side-wall 414, wherein the right side-wall 413 is opposite to the left side-wall 414 and connects with the bottom side-wall 412 and the top side-wall 411. A protrusion 430 is formed on the top side-wall 411 and a through opening 418 is formed on each of the left and right side-walls 414, 413. A hollow inner housing 450 is placed within the outer housing 410 that may move back and forth through a rectangular opening 416 on the front end of the outer housing 410. In addition, a ferrule 440 is placed in the inner housing 450 and protrudes from a circular opening 456 on the front end of the inner housing 450 and from the opening 416 on the outer housing 410. A spring is located inside the inner housing 450 to allow the ferrule 440 to move back and forth through the openings 416, 456 (not shown in the figure).

Referring to FIGS. 5a, 5b, 5c, 6a and 6b, the optical fiber adapter according to the present disclosure includes a molded plastic main body 510 and an elastic shutter member 570. The main body 510 is substantially rectangular and has an accommodation room 515 defined by a top side-wall 511, a bottom side-wall 512, a right side-wall 513 and a left side-wall 514. An inner housing 560, such as a hooking member, is placed within the accommodation room 515. The hooking member 560 is provided with a pair of hooks 564 extending from one end of a generally rectangular flange 562. The flange 562 includes a hollow cylinder 568 located between the two hooks 564. A pair of protrusions 517 substantially has an inverted L shape and is formed within the accommodation room 515 and on the bottom side-wall 512. Each of the protrusions 517 includes a vertical portion 518 extending upward from the bottom side-wall 512 and a horizontal portion 519 extending horizontally from the top of the vertical portion 518. Therefore, a clear gap is formed between the horizontal portion 519 and the bottom side-wall 512. A recess 521 is formed outside the accommodation room 515 and on the bottom side-wall 512. The recess 521 extends to an edge of the bottom side-wall 512. In addition, an indentation 522 is formed on the recess 521. The indentation 522 may be a through opening extending through the bottom side-wall 512 into the accommodation room 515.

Figure 6A:
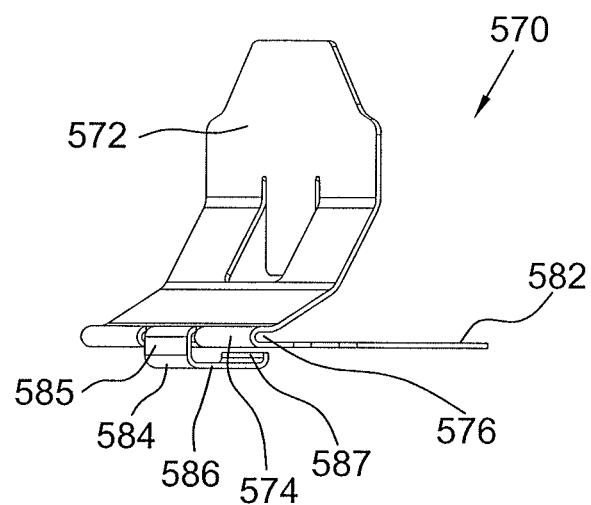
FIG. 6a is an elevated perspective view of the shutter member of the optical fiber adapter of the present disclosure.
Figure 6B:
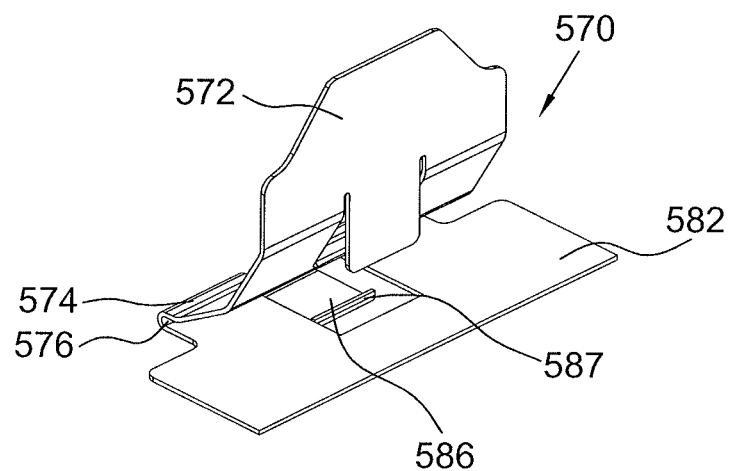
FIG. 6b is another elevated perspective view of the shutter member of the optical fiber adapter of the present disclosure.

Referring to FIGS. 6a and 6b, the elastic shutter member 570 is integrally formed with metal. The shutter member 570 includes a shutter plate 572, a fixing portion 582, a connecting portion 574 and a hooking portion 584. The fixing portion 582 is plate-like. The connecting portion 574 connects the fixing portion 582 with the shutter plate 572 and is generally C-shaped. That is, the connecting portion 574 is curved and has a notch 576. The shutter plate 572 may contain a single plate or double plates. The shutter plate 572 may move with respect to the fixing portion 582 and the angle between the above two elements is smaller than 90 degrees. The shutter plate 572 is moved close to the fixing portion 582 with a push force and quickly moves back when the push is withdrawn. The hooking portion 584 extends from the connecting portion 574 and includes a vertical portion 585 extending downward from the connecting portion 574, a horizontal portion 586 extending horizontally from the vertical portion 585 toward the fixing portion 582, and a vertical portion 587 extending upward from the rear end of the horizontal portion 586.

Figure 7:
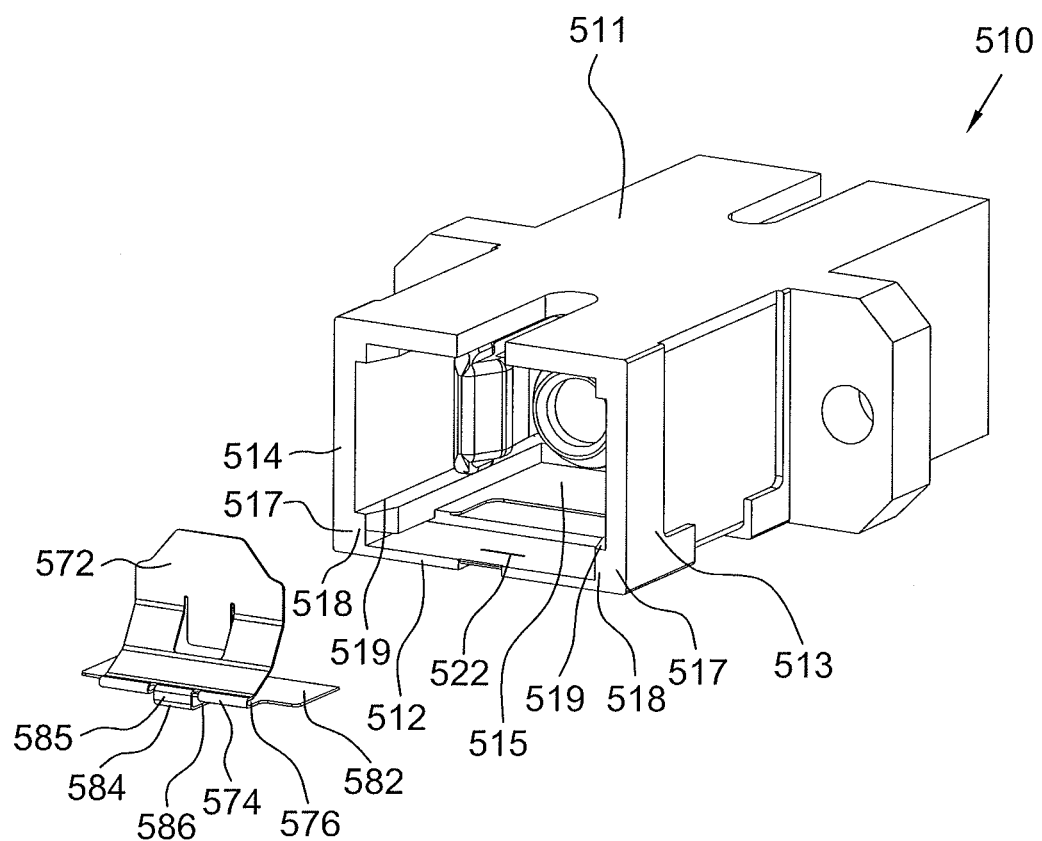
FIG. 7 is an elevated perspective view of the optical fiber adapter of the present disclosure, wherein the shutter member is separated from the main body.
Figure 8:
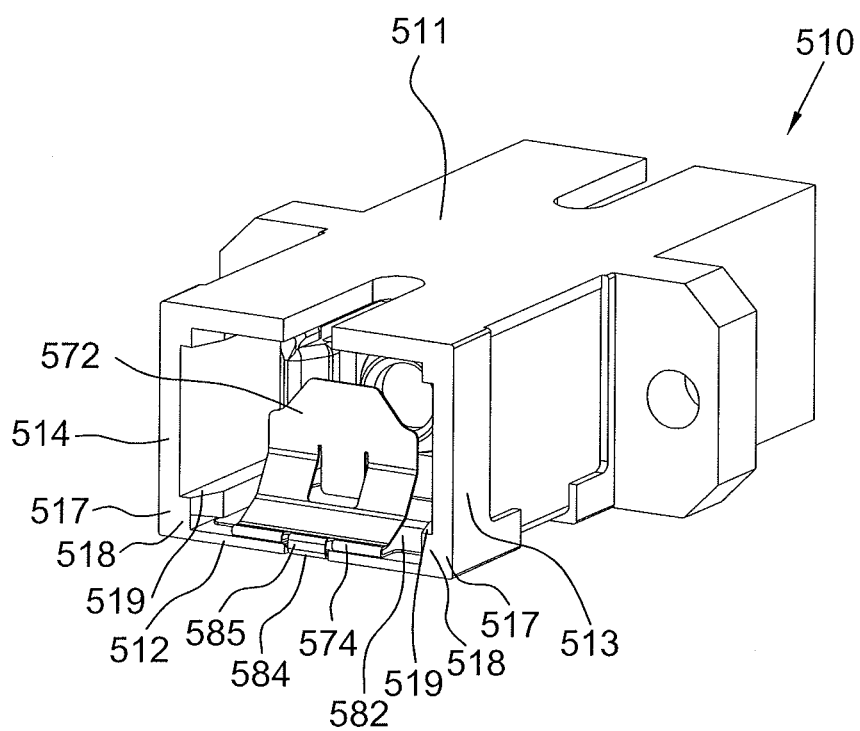
FIG. 8 is an elevated perspective view of the optical fiber adapter of the present disclosure.

Referring to FIGS. 7 and 8, when desiring to install the shutter member 570 in the main body 510, the fixing portion 582 is pushed into the accommodation room 515 such that each of two opposing sides of the fixing portion 582 is positioned between the horizontal portion 519 of one of the protrusions 517 and the bottom side-wall 512. Furthermore, the horizontal portion 586 of the hooking portion 584 is positioned in the recess 521 and the vertical portion 587 extends into the indentation 522.

According to the optical fiber adapter of the present disclosure, the hooking portion 584 will hook on to the indentation 522 when a pull force is exerted on the shutter member 570. Consequently, the hooking portion 584 may prevent the shutter member 570 from being pulled out of the main body 510. Furthermore, the sides of the fixing portion 582 are positioned under the horizontal portions 519 of the protrusions 517. This may prevent the shutter member 570 from being pulled upward from the bottom side-wall 512.

According to the optical fiber adapter of the present disclosure, the shutter plate 572 will be located in front of the opening of the hollow cylinder 568 when the shutter member 570 is positioned in place. This way the light beams emitted from the cylinder 568 may be obstructed thereby preventing a user's eyes from exposure to the harmful light beams.

Referring to FIGS. 9 and 10, according to the optical fiber adapter of the present disclosure, there is no need to detach the shutter member 570 from the main body 510 prior to inserting the optical fiber connector 400 into the main body 510. When the connector 400 is inserted into the main body 510, it will push down the elastic shutter plate 572 to the gap between the connector 400 and the bottom side-wall 512 of the main body 510. Upon pulling out the connector 400, the elastic shutter plate 572 will quickly spring up to an original position to obstruct the light beams emitted from the cylinder 567 as a result of elasticity. As a result, the occurrence of exposure to the harmful light beams may be avoided.

Although the present disclose has been explained in detailed with SC type optical fiber adapter, it will be appreciated that the optical fiber adapter of the present disclosure may include other types of adapters. For example, the optical fiber adapter of the present disclosure may be the LC type optical fiber adapter.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter, comprising:
    a main body having an accommodation room defined by a first wall, a second wall, a third wall and a fourth wall, the first wall facing the third wall and connecting with the second and fourth walls, wherein an indentation is formed outside the accommodation room and on the third wall; and
    an elastic shutter member, including:
        a fixing portion positioned within the accommodation room and on the third wall;
        a shutter plate;
        a connecting portion connecting the fixing portion with the shutter plate; and
        a hooking portion extending from the connecting portion to hook on to the indentation on the third wall;
        wherein the shutter plate extends from the connecting portion and into the accommodation room.

2. The optical fiber adapter as claimed in claim 1, wherein the hooking portion has a first vertical portion, a horizontal portion and a second vertical portion, the first vertical portion extends from the connection portion, the horizontal portion extends from the first vertical portion and is positioned outside the accommodation room and on the third wall, the second vertical portion extends from the horizontal portion and into the indentation on the third wall.

3. The optical fiber adapter as claimed in claim 2, wherein a recess is formed on the third wall, the horizontal portion of the hooking portion is positioned in the recess.

4. The optical fiber adapter as claimed in claim 1, wherein two protrusions are formed on the third wall, each of the protrusions comprising:
    a vertical portion extending from the third wall; and
    a horizontal portion extending from the vertical portion, wherein a gap is formed between the horizontal portion and the third wall;
    wherein the fixing portion of the shutter member has two opposing sides and each of the two opposing sides is positioned between the third wall and the horizontal portion of one of the protrusions.

5. The optical fiber adapter as claimed in claim 1, wherein the shutter member is made of metal.

6. The optical fiber adapter as claimed in claim 1, wherein the optical fiber adapter is an SC type optical fiber adapter.

7. The optical fiber adapter as claimed in claim 1, wherein the indentation extends through the third wall into the accommodation room.

8. A shutter member for an optical fiber adapter, the optical fiber adapter including a main body having an accommodation room defined by a first wall, a second wall, a third wall and a fourth wall, the first wall facing the third wall and connecting with the second and fourth walls, wherein an indentation is formed outside the accommodation room and on the third wall, the shutter member comprising:
    a fixing portion;
    a shutter plate;
    a connecting portion connecting the fixing portion with the shutter plate; and
    a hooking portion having a first vertical portion, a horizontal portion and a second vertical portion, wherein the first vertical portion extends from the connection portion, the horizontal portion extends from the first vertical portion, and the second vertical portion extends from the horizontal portion;
    wherein the shutter plate is configured to extend into the accommodation room, the fixing portion is configured to be positioned within the accommodation room and on the third wall, and the second vertical portion is configured to extend into the indentation on the third wall.

9. The shutter member as claimed in claim 8, wherein the shutter member is made of metal.

* * * * *